United States Patent
Grivna et al.

(10) Patent No.: US 7,062,177 B1
(45) Date of Patent: Jun. 13, 2006

(54) OUT OF BAND COMMUNICATIONS LINK FOR 4-LANE OPTICAL MODULES USING DARK FIBERS AND LOW-BANDWIDTH LEDS

(75) Inventors: Edward L. Grivna, Brooklyn Park, MN (US); Jeffrey D. Dekosky, Alpharetta, GA (US)

(73) Assignee: Cypress Semiconductor Corp., San Jose, CA (US)

( * ) Notice: Subject to any disclaimer, the term of this patent is extended or adjusted under 35 U.S.C. 154(b) by 565 days.

(21) Appl. No.: 10/183,812

(22) Filed: Jun. 25, 2002

(51) Int. Cl.
*H04B 10/00* (2006.01)

(52) U.S. Cl. .......................... 398/162; 398/16
(58) Field of Classification Search ................ 398/38, 398/162, 197, 16, 30, 31, 32, 33
See application file for complete search history.

(56) References Cited

U.S. PATENT DOCUMENTS

| | | | |
|---|---|---|---|
| 4,642,804 A * | 2/1987 | Personick ................. | 398/91 |
| 4,994,675 A * | 2/1991 | Levin et al. ............... | 250/551 |
| 5,136,410 A * | 8/1992 | Heiling et al. ............. | 398/15 |
| 5,432,874 A * | 7/1995 | Muraguchi ................ | 385/24 |
| 5,615,033 A * | 3/1997 | Yoshida et al. ............ | 398/15 |
| 5,801,860 A * | 9/1998 | Yoneyama ................. | 398/94 |
| 6,246,499 B1 * | 6/2001 | Kunito et al. ............. | 398/162 |
| 6,738,584 B1 * | 5/2004 | Tsuda et al. .............. | 398/147 |

OTHER PUBLICATIONS

"InfiniBand™ Architecture Specification vol. 1", Release 1.0.a, InfiniBand$^{SM}$ Trade Association, Jun. 19, 2001, pp. 1-2, 124-194.
"InfiniBand™ Architecture Specification vol. 2", Release 1.0.a, InfiniBand$^{SM}$ Trade Association, Jun. 19, 2001, pp. 1-2, 49-131, 180-224.
"Very Short Reach (VSR) OC-192 four fiber Interface Based on Parallel Optics",Optical Internetworking Forum, Aug. 17, 2000, pp. 1-14, Fremont, California.
"Fibre optic connector interfaces—Part 7: Type MPO connector family", (Edition 1:1996 consolidated with amendments 1:1999 and 2:2000), International Electrotechnical Commission, Nov. 2000, pp. 1-29, Geneva, Switzerland.
"Fibre Channel—10 Gigabit (10GFC)", Rev. 2.0, American National Standards Institute, Dec. 20, 2001, pp. 1-88, New York, New York.

* cited by examiner

*Primary Examiner*—Christina Y Leung
(74) *Attorney, Agent, or Firm*—Christopher P. Maiorana, PC

(57) ABSTRACT

A module generally comprising a first transmitter, a detector and a controller. The first transmitter may be configured to transmit through a first physical channel of a connector. The detector may be configured to receive a first status signal but not receive user data through a second physical channel of the connector. The controller may be configured to adjust a power of the first transmitter in response to the first status signal.

20 Claims, 5 Drawing Sheets

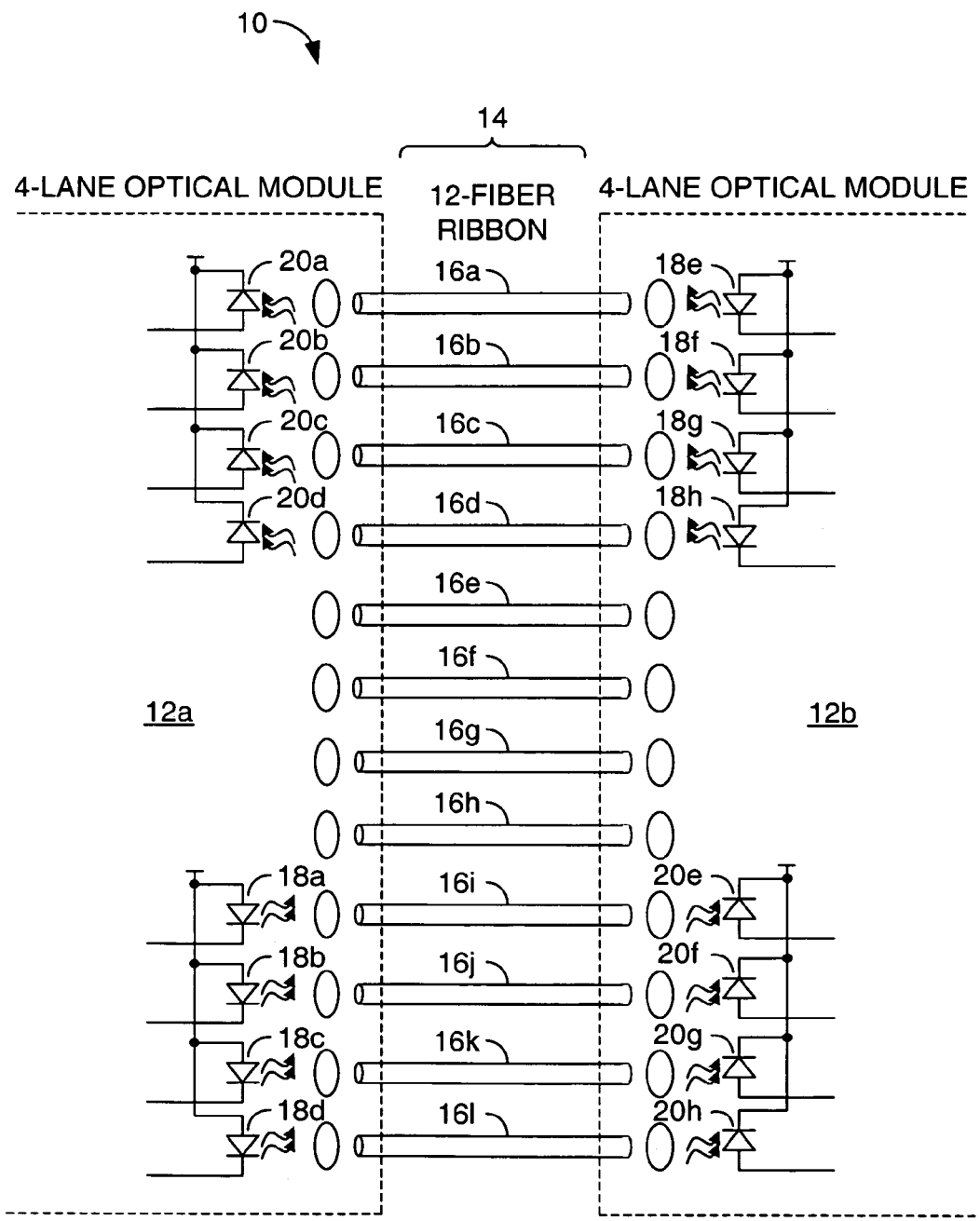
CONVENTIONAL
FIG. 1

OUT OF BAND COMMUNICATIONS LINK FOR 4-LANE OPTICAL MODULES USING DARK FIBERS AND LOW-BANDWIDTH LEDS

FIELD OF THE INVENTION

The present invention relates to a method and/or architecture for communications generally and, more particularly, to a communications method and/or architecture using low-bandwidth visible light optical transmitters on dark fibers.

BACKGROUND OF THE INVENTION

Conventional high-speed optical modules use lasers to transmit user data through an optical link. For those modules that control laser power with a local control loop, the lasers are monitored locally at a transmit end by local photodiodes to ensure that the output power of the lasers remain within a target range of operation. The local photodetectors are additional hardware that duplicate detectors at a remote (receive) end of the optical link. For modules not implementing a feedback loop, the lasers are factory preset to a predetermined power level and are at an end-of-life when degraded to a point where error-rate requirements are not being meet.

Implementation of a local photodetector for each laser increases the space claim and physical placement complexity within the optical module, the cost of the optical module, and the power dissipation of the optical module as compared to an implementation without the local photodetectors. In addition, the local photodetectors do not provide feedback as to the power needed to have a reliable link. Therefore, the lasers are operated at a maximum allowed power for the specific environment regardless of the optical power reaching the receive end.

In short optical links, where link related loses are minimal, the receive end of the optical link can feed back the level of received power as status information and allow the source to reduce power while still maintaining a valid link and meeting error rate requirements. However, a mechanism must be provided to return the power level status information from the receive end to the power control function at the transmit end. For optical links that make use of remote power and link status reporting, the status information is commonly transmitted through an alternate communications link or mixed with the normal user data traffic carried through the optical link.

Implementing the alternate communications links involves a separate electrical or optical connector at each end of the optical link and separate media paralleling the optical link to carry the status and other maintenance information. The alternative link is not commonly supported by an existing optical cable infrastructure. Therefore, in a single link system, the cost of the additional link can easily double the cost of the original link.

Mixing the status information with the user data results in some loss of the normally available user bandwidth. Furthermore, the user protocol must be modified to support the transport of the embedded status information (which is commonly not supported by standardized communication protocols). Mixing user and nonuser data is also commonly used for other laser safety protocols that determine only the presence or absence of optical power and do not interpret the content of the modulated bit stream.

Referring to FIG. 1, a block diagram of a conventional four-lane optical system 10 is shown. The conventional system 10 includes an optical transceiver module 12a-b at each end of an optical cable 14 having twelve fibers 16a-l. Transceiver module 12a has four laser diode sources 18a-d and four photodetectors 20a-d. Transceiver module 12b has four laser diodes 18e-h and four photodetectors 20e-h. Fibers 16a-d are used to transmit from the optical module 12b to the optical module 12a. The fibers 16i-l are used to transmit in the other direction. The four fibers 16e-h in the middle of the optical cable 14 are unused.

SUMMARY OF THE INVENTION

The present invention concerns a module generally comprising a first transmitter, a detector, and a controller. The first transmitter may be configured to transmit through a first physical channel of a connector. The detector may be configured to receive a first status signal but not receive user data through a second physical channel of the connector. The controller may be configured to adjust a power of the first transmitter in response to the first status signal.

The objects, features, and advantages of the present invention include providing a communications method and/or architecture using low-bandwidth optical transmitters on dark fibers that may (i) utilize unused fiber optic strands in a conventional multi-fiber optical cable, (ii) allow transmitter power output levels to be maintained over time, (iii) provide a laser safety interlock and/or (iv) optimize laser performance for a specific application.

BRIEF DESCRIPTION OF THE DRAWINGS

These and other objects, features, and advantages of the present invention will be apparent from the following detailed description and the appended claims and drawings in which:

FIG. 1 is a block diagram of a conventional four-lane optical system;

DETAILED DESCRIPTION OF THE PREFERRED EMBODIMENTS

Figure 2:
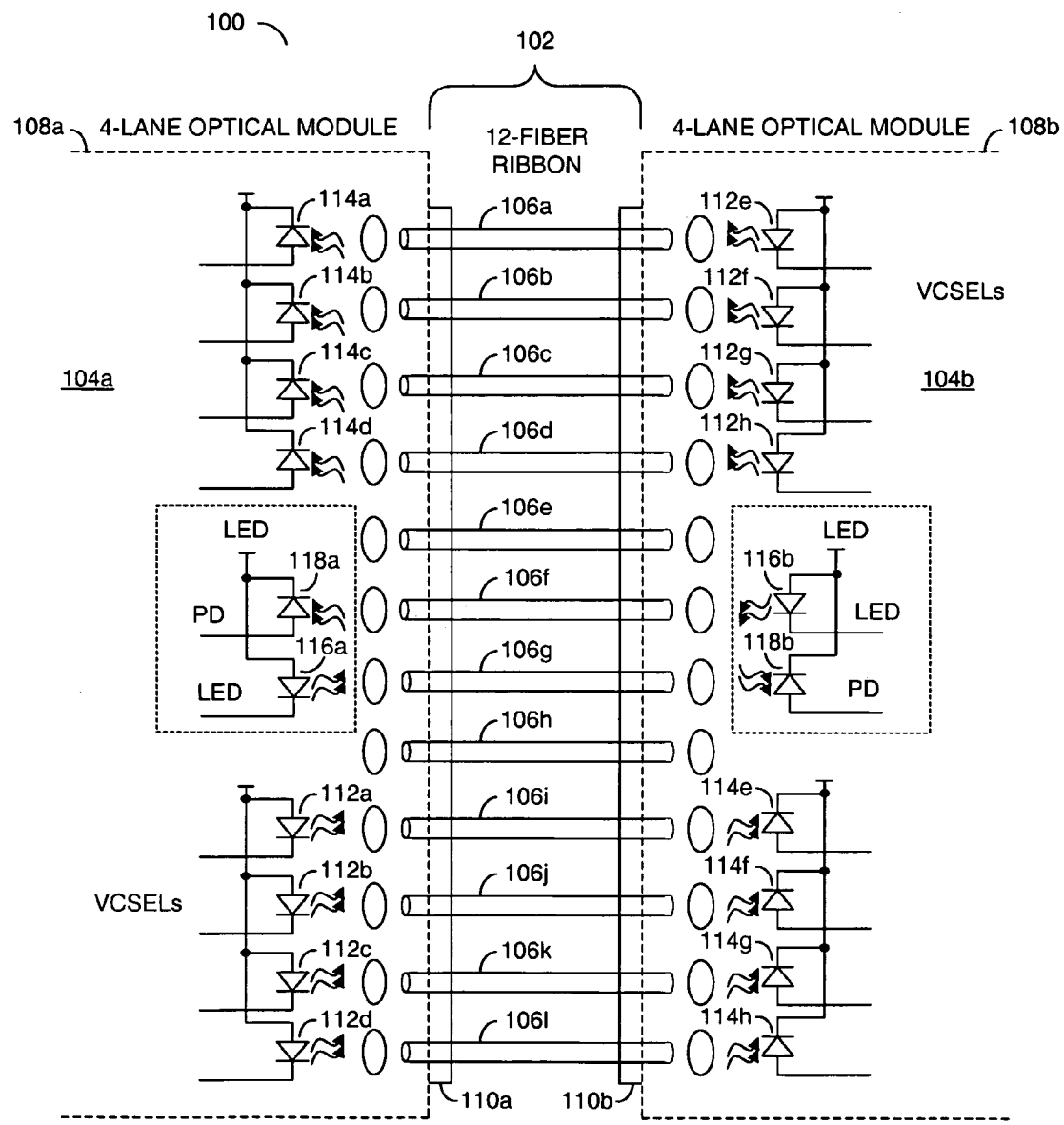
FIG. 2 is a block diagram of an optical system in accordance with a preferred embodiment of the present invention.

Referring to FIG. 2, a block diagram of an optical system 100 is shown in accordance with a preferred embodiment of the present invention. The system 100 may be implemented as a communication system used to move link status information through an optical or communications link which is normally considered to be 100% utilized, while generally having no impact on the normal data content or usefulness. The system 100 may make use of otherwise dark (unused) fiber in a cable 102 to carry status and/or configuration information between circuits or modules 104a-b. A low bandwidth of the status and/or configuration information may allow optical sources used to transmit the status and/or configuration information between the modules 104a-b to be eye-safe, non-coherent light instead of a laser beam, and thus not constrained by normal laser safety requirements.

Each module 104a-b may be implemented as a four-lane optical module. The modules 104a-b may comply with the 10 Gigabit Fibre Channel draft specification T11/Project 1413-D (published by the American National Standards Institute, New York, N.Y.), the InfiniBand™ Architecture specification (published by the InfiniBand Trade Association, Portland, Oreg.), or a Synchronous Optical Network (SONET) Very Short Reach (VSR) standard defined by the Optical Internetworking Forum (OIF) Implementation Agreement OIF-VSR4-03.0 (published by the Optical Internetworking Forum, Fremont, Calif.) hereby incorporated by reference in their entirety. The modules 104a–b may comply with other standards to meet the design criteria of a particular application.

The cable 102 may be implemented as a ribbon-fiber cable. The fiber cable 102 may be terminated with connectors that comply with the Fibre Optic Connector Interfaces—Part 7: Type MPO Connector Family specification IEC 61754-7 (published by the International Electrotechnical Commission, Geneva, Switzerland) hereby incorporated by reference in its entirety. In one example, the fiber cable 102 may have twelve strands or fibers. In another example, the fiber cable 102 may have a length of up to 300 meters. Furthermore, the fiber cable 102 may be implemented without introducing a twist between the modules 104a–b. Other cable standards may be implemented to meet the design criteria of a particular application.

The fiber cable 102 generally comprises multiple physical channels 106a–l. Each physical channel 106 may be implemented as a multi-mode fiber optic strand. Each fiber optic strand 106 may be a 50 micrometer (μm) or a 62.5 μm multi-mode fiber. Other physical channels, such as coaxial cable, twisted wire pairs, transmission line, single mode fiber strand or the like may be implemented to meet the design criteria of a particular application.

The module 104a generally comprises a housing 108a, a connector 110a, multiple lasers 112a–d, multiple photodetectors 114a–d, a light emitting diode (LED) 116a, and another photodetector 118a. The module 104b generally comprises a housing 108b, a connector 110b, multiple lasers 112e–h, multiple photodetectors 114e–h, an LED 116b, and a photodetector 118b. The fiber cable 102 may be arranged to couple the lasers 112 and LED 116 of a module 104 to the photodetectors 114 and 118 of the other module 104.

An example of how the fiber cable 102 may couple the module 104a to the module 104b may be provided as follows. The fiber optic strands 106i–l may couple the lasers 112a–d to the photodetectors 114e–h. Likewise, the lasers 112e–h may be coupled through the fiber optic strands 106a–d to the photodetectors 114a–d. The fiber optic strand 106f may couple the LED 116b to the photodetector 118a. The fiber optic strand 106g may couple the LED 116a to the photodetector 118b. The fiber optic strands 106e and 106h may be unused or dark fibers. In another embodiment, the fiber strands 106e and 106h may be used to couple the LEDs 116 and the photodetectors 118 while the fiber optic strands 106f and 106g may remain dark.

Other arrangements of the lasers 112, photodetectors 114 and 118, LEDs 116, and fiber optic strands 106 may be implemented to meet the design criteria of a particular application. For example, the fiber cable 102 may have as few as two fiber optic strands 106. A first fiber optic strand 106a may be provided for carrying user data from the module 104b to the module 104a. A second fiber optic strand 106g may be positioned for carrying a status signal from the module 104a back to the module 104b. In another example, other non-coherent and/or wide chromatic spectrum light sources may be used in place of the LEDs 116.

In another example, the fiber cable 102 may have four fiber optic strands 106. A first fiber optic strand 106d may convey user data from the module 104b to the module 104a. A second fiber optic strand 106g may be provided for conveying status information from the module 104a to the module 104b. A third fiber optic strand 106f may be provided to carry additional status information from the module 104b to the module 104a. A fourth fiber optic strand 106i may carry additional user data from the module 114a to the module 104b.

A target use for the LEDs 116 and associated photodetectors 118 may be to report link status and received laser power levels back to the laser sources (e.g., the modules 104a–b). The received laser power level information generally allows the modules 104a–b to adjust, optimize, and maintain laser power output levels as the lasers 112 and/or fiber optic strands 106 degrade with time. The received laser power level information may also be used to implement a laser safety interlock protocol to allow higher laser launch power while maintaining a class-1 laser safe environment. Because two of the fiber optic strands 106f/g or 106e/h only carry status information (which may occur or may be reported at a much lower rate than normal data transfers), the two fiber optic strands 106f/g or 106e/h may be implemented with alternate technology that could be lower in cost than the fiber optic strands 106a–d and 106i–l used to carry user data.

Figure 3:
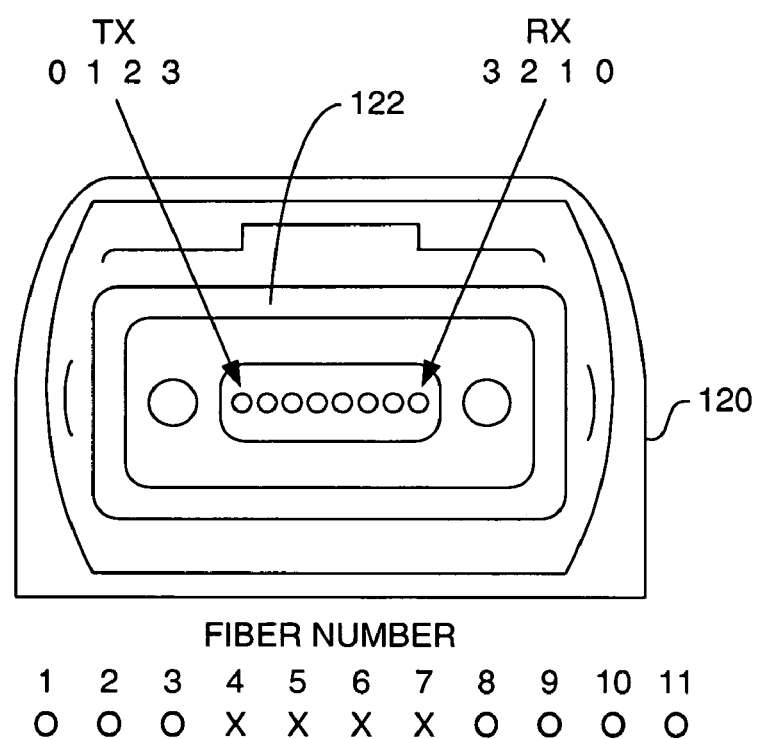
FIG. 3 is a diagram of a multi-fiber connector.

Referring to FIG. 3, a diagram of a multi-fiber connector 120 used for four-lane optical links is shown. Conventional 4-lane optical transceivers, such as those specified by the 10 G Fibre Channel, the InfiniBand™, and the OIF VSR specifications or standards, may all be implemented with a Multiple Parallel Optics (MPO) connector 120. The MPO connector 120 may be defined by the IEC standard 61754-7. The MPO connector 120 generally has a twelve-fiber MT-type ferrule 122 connectable to the twelve-fiber ribbon cable 102.

Within the twelve-fiber ferrule 122, the outer four fibers on each side (e.g., numbers 0, 1, 2, 3, 8, 9, 10, and 11) may be active (e.g., marked with an "O"). The center four fibers (e.g., numbered 4, 5, 6, and 7) are generally dark or unused (e.g., marked with an "X"). Conventional fiber cables 102 that may be used to interconnect the modules 104a and 104b may be built with all twelve fiber optic strands 106a–l in place. The twelve fiber optic strands 106a–l may be fabricated because twelve-channel modules are also made and it generally costs manufacturers less to build and stock only twelve-fiber cables than to build and stock both eight-fiber and twelve-fiber cables.

The normally dark fibers in the twelve-fiber cable 102 may be used for low-speed signaling between the modules 104a and 104b. The low-speed signaling of status information may represent an inclusion of a normally out-of-band signaling function along fiber optic strands 106 that may already be present in the inter-module link. The low-speed signaling may provide a separate inherently eye-safe link (e.g., light from the LEDs 116). The eye-safe link may be used to implement a laser safe link initialization protocol. Using a spectrally visible form of signaling as part of the eye-safe link generally allows the laser safe link initialization protocol to enhance user avoidance of potentially hazardous optical radiation.

Other types of connectors 120 and cables 102 may be used in other embodiments to meet the design criteria of particular applications. For example, the connectors 120 and the cable 102 may comply with a Mini-MT, a Mini-MPO, a 16MT, a 24MT, a 60MT, an 80MT, an MTP, an MT-RJ, an MT_BP design, an SMC connector or similar connector/cable interface types. Electrical or other non-optical type connectors may also be used in particular applications where the physical channels 106 are electrical or non-optical in nature. A mixture of optical and non-optical connections within a connector 120 and cable 102 may also be used where the low-speed link may be non-optical and the user data links are optical.

Figure 4:
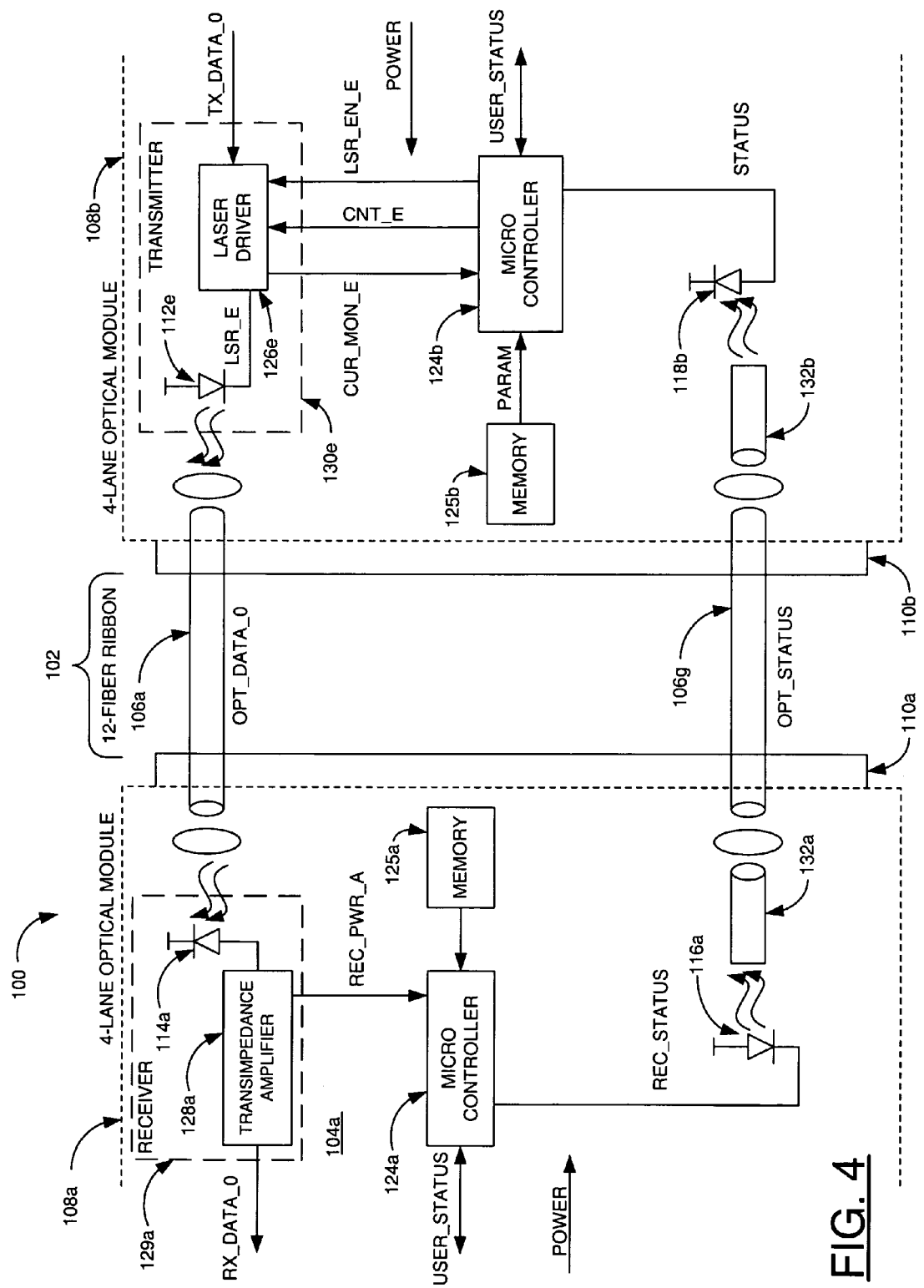
FIG. 4 is a partial block diagram of the system.

Referring to FIG. 4, a partial block diagram of the system 100 is shown. The system 100 may provide for one or two feedback or information loops for each laser 112. A first information loop may be established through the fiber cable 102. Another information loop may be established internal to each of the modules 104a and 104b.

In addition to the components shown in FIG. 2, the module 104a may include a controller 124a, a memory 125a, multiple laser drivers 126a–d, and multiple transimpedance amplifiers 128a–d. The laser drivers 126a–d may operate similarly to the laser drivers 126e–h in the module 104b, as described below, and thus are not shown within the module 104a for clarity. The photodetectors 114b–d and the associated transimpedance amplifiers 128c–d are similar to the photodiode 114a and the transimpedance amplifier 128a and thus are not shown for clarity. The controller 124a may be implemented as a micro controller, microprocessor, a state machine, or similar logic circuit. The module 104b may have similar components as the module 104a.

Each photodiode 114a–d may receive a signal OPT_DATA_0–3 from a respective fiber 106a–d and convert the signal to a corresponding current. Each transimpedance amplifier 128a–d may receive the corresponding current from the respective photodiode 114a–d. Each transimpedance amplifier 128a–d may generate a signal (e.g., RX_DATA_0 through RX_DATA_3) to transfer the received data. Each transimpedance amplifier 128a–d may also generate a signal (e.g., REC_PWR_A through REC_PWR_D) indicating an amount of optical power received by the photodiodes 114a–d.

The controller 124a may be coupled to each of the transimpedance amplifiers 128a–d to receive the signals REC_PWR_A–D. The controller 124a may generate and present a signal (e.g., REC_STATUS) to the LED 116a. The LED 116a may convert the signal REC_STATUS from an electrical form into an optical form as another signal (e.g., OPT_STATUS).

In addition to the components shown in FIG. 2, the module 104b may include a controller 124b, a memory 125b, multiple laser drivers 126e–h (only the laser driver 126e is shown for clarity), and multiple transimpedance amplifiers 128e–h (not shown for clarity). The controller 124b may be similar to the controller 124a in the module 104a. In one embodiment, the memory 125b may be an integrated part of the controller 124b. The controller 124b may receive a signal (e.g., STATUS) from the photodiode 118b. A signal (e.g., PARAM) may be received by the controller 124b from the memory 125b. The controller 124b may generate and present a signal (e.g., CNT_x, where $E \leq x \leq H$) to each of the respective laser drivers 136e–h. The controller 124b may generate and present an enable signal (e.g., LSR_EN_x, where $E<x<H$) to each of the respective laser drivers 136e–h. A signal (e.g., USER_STATUS) may be generated and/or received by the controller 124b through a bi-directional connection.

Each laser driver 126e–h may receive electrical power (e.g., POWER) for operating the respective lasers 112e–h. Each laser driver 126e–h may also receive a signal (e.g., TX_DATA_0 through TX_DATA_3) from a host system (not shown) that may be a source of the data streams conveying user data sent across the fiber optic link. Each laser driver 126e–h may generate and provide a modulated current signal (e.g., LSR_E through LSR_H) to the respective lasers 112e–h. Each laser driver 126e–h may also generate and provide a signal (e.g., CUR_MON_x, where $E \leq x \leq H$) to the controller 124b.

The lasers 112 may be implemented as vertical cavity surface emitting lasers (VCSEL). Other types of lasers may be used in a particular design to meet the criteria of a particular application. Each laser 112e–h may convert the signal LSR_x to a respective optical signal (e.g., OPT_DATA_y, where $0 \leq y \leq 3$). Only the optical signal OPT_DATA_0 is shown for clarity. A combination of each laser 112 and a respective laser driver 126 may also be referred to as a transmitter 130e–h. The photodetectors 114a–d and the transimpedance amplifiers 128a–d in the module 104a may receive, detect, and convert the optical signal OPT_DATA_0–3 into the respective signals REC_PWR_A–D. A combination of each photodiode 114 and a respective transimpedance amplifier 128 may also be referred to as a receiver 129.

The signals REC_PWR may be implemented as electrical signals. Each signal REC_PWR may convey information about an amount of optical power received by a photodetector 114. Each signal REC_PWR may be independent of other signals REC_PWR.

The signal REC_STATUS may be implemented as an electrical signal. The signal REC_STATUS may time division multiplex the received power information from signals REC_PWR. Other information may be multiplexed into the signal REC_STATUS for transfer to the module 104b. For example, the signals USER_STATUS may be used to transfer other information between the controllers 124a and 124b. The other information may include, but may not be limited to voltage, temperature, operational state and so forth.

The signal OPT_STATUS may be implemented as an optical signal. In particular, the signal OPT_STATUS may be implemented as a non-coherent optical signal. Preferably the signal OPT_STATUS may be visible to a human eye, although the signal OPT_STATUS may be infrared or another invisible wavelength. The signal OPT_STATUS may convey information from the module 104a to the module 104b equivalent to the information generated by the controller 124a in the signal REC_STATUS. Generally, the signal OPT_STATUS may be considered to be an out-of-band signal that may not normally be part of a standard communication protocol used between the modules 104a and 104b.

The signal STATUS may be implemented as an electrical status signal. The signal STATUS may convey the same information as the optical signal OPT_STATUS. The signal STATUS may therefore convey the same information as the signal REC_STATUS.

The signal PARAM may be implemented as an electrical signal. The signal PARAM may provide lookup table type information to the controller 124b for converting feedback values in the signals CUR_MON and/or STATUS into appropriate control values in the signals CNT and LSR_EN.

The signals CNT may be implemented as electrical control signals. Each signal CNT may provide instructions to a respective laser driver 126 regarding how much optical power the associated laser 112 should generate. Each signal CNT_A–H may be uniquely generated for each laser driver 126/laser 112 pair.

The signals TX_DATA and RX_DATA may be implemented as one or more electrical data signals. The signals TX_DATA may carry information from a user or client to be transmitted from a sending module 104 to a receiving module 104. The signals RX_DATA may represent received versions of the signals TX_DATA at the receiving module 104. Audio, visual, files, data streams, and other forms of user data may be provided to the transmitters 130 by the signals TX_DATA.

Each signal TX_DATA and the corresponding signal RX_DATA may convey some or all of the user information depending upon a particular application. For example, in some applications, the signals TX_DATA_0–3 may each carry every fourth bit of the user data in parallel simultaneously. In another application, the signal TX_DATA_0 may carry all of the information provided by a first user, the signal TX_DATA_1 may carry all of the information provided by a second user, the signal TX_DATA_2 may carry all of the information provided by a third user, and the signal TX_DATA_3 may carry all of the information provided by a fourth user. Other arrangements of the user data among the signals TX_DATA_0–3 may be implemented to meet the design criteria of a particular application.

The signals LSR_EN may be implemented as electrical signals. Each signal LSR_EN may have an enable state to enable a respective transmitter 130. Each signal LSR_EN may have a disable state to disable the respective transmitter 130.

The signals CUR_MON may be implemented as electrical power or current utilization feedback signals from the laser driver 126. Each signal CUR_MON may provide the controller 124b with an indication of how much electrical current may be provided to the respective laser 112. The controller 124b may use the data in the signals CUR_MON to control the signals LSR_EN.

The signals LSR may be implemented as electrical signals. The signals LSR may be generated by the laser drivers 126 to drive or power the individual lasers 112. Each signal LSR may also carry some or all of the user data as defined by the respective signal TX_DATA.

The signals OPT_DATA may be implemented as infrared optical signals. In one embodiment, the signals OPT_DATA may be implemented as narrow spectral width laser light. The signals OPT_DATA may be modulated to transfer the user data provided in the signals LSR.

Operationally, the host system may distribute the user data among the signal TX_DATA_0 through TX_DATA_3 for transmission across the fiber cable 102. Each transmitter 130e–h may convert the information in the signals TX_DATA_0–3 into the laser signals OPT_DATA_0–3 that are then transmitted to the module 104a. The module 104a may monitor the amount of optical power received by each photodiode 114a–d and provide feedback of what was actually received to the module 104b via the signal OPT_STATUS. The controller 124b within the module 104b may then adjust the signals CNT_E–H to adjust each individual transmitter 130e–h based upon the feedback received in the signal STATUS.

Long information loops are generally established from the controller 124b through the transmitters 130e–h, the fiber optic strands 106a–d, the photodiodes 114a–d, transimpedance amplifiers 128a–d, the controller 124a, the LED 116a, the fiber optic strand 106g, the photodiode 118b, and back to the controller 124b. Since the transimpedance amplifiers 128a–d generally measure the amount of laser light reaching the module 104a side of the fiber cable 102 and the measured values are returned to the controller 124b as the signal STATUS, the controller 124b may operate the lasers 112e–h at generally less than maximum power and therefore extend the life of the lasers 112e–h. A similar benefit may be achieved for the lasers 112a–d by monitoring the amount of laser light received at the module 104b and then feeding the information back to the module 104a.

A short information loop may be established inside each module 104a and 104b. For example, the signals CUR_MON_E through CUR_MON_H may be processed by the controller 124b to determine in part the signals LSR_EN_E through LSR_EN_H provided to the laser drivers 126e–h. However, the short feedback loop is generally not directly translated into optical output power since a conversion efficiency of the lasers 112 may not be a constant and may vary with temperature and usage life of the lasers 112. Therefore, the short information loop is generally used for fault detection and shut-down in the event that one or more of the lasers 112 sink too much or too little current.

By using standard LEDs 116a–b as optical sources (preferably having an optical emission within in the visible spectrum), low-bandwidth links between the two optical modules 104a and 104b may be established. The modules 104a–b and fiber cable 102 are generally implemented with multi-mode fiber and thus may be capable of carrying light from the LEDs 116a–b without difficulty. Each LED 116a–b generally has a very wide launch angle (a numerical aperture) and may be spectrally impure. Therefore, the LEDs 116a–b are generally unusable for the high-speed signaling performed for the user data. However, the optical characteristics of the LEDs 116a–b are inherently eye-safe and are free of eye safety restrictions that may be imposed on the lasers 112a–h.

The LED 116 and photodetector 118 pairs are generally very low cost items and (unlike the photodetectors 114 and the VCSELs 112 or other semiconductor lasers) may have flexible drive constraints. Driving the LEDs 116 with current may cause a light emission. Removing the current from the LEDs 116 results in no light emission or darkness. In contrast, a semiconductor laser is generally never fully turned off in normal operation. Instead, a light output of a semiconductor laser may be modulated between a high output level and a low output level. Furthermore, the recovery mechanism for the VCSELs 112 generally include high-performance photodetectors 114 and transimpedance amplifiers 128 connected to a phase lock loop (not shown) for clock and data extraction.

With a low-speed LED link, the LEDs 116 may be directly driven and monitored from the controllers 124 using only a few milliamps of current. The signaling rate of a low-cost LED may still provide hundreds of kilobits per second. While hundreds of kilobits per second may be insufficient for user data communications, the hundreds of kilobits per second are generally more than enough for link maintenance. A time span to bring up a link using conventional laser safety interlocks can exceed ten seconds, during which over a megabit of configuration data may be transfer between the modules 104 via the low-speed links.

The LED 116/photodetector 118 pair may be located on either fiber optic strands 106e and 106h (numbers 4 and 7) or on the fiber optic strands 106f and 106g (numbers 5 and 6). The order of LEDs 116 and detectors 118 may also be reversed from that shown in FIG. 2. The wavelength of the optical source may be anything supported by the detectors 118 and the fiber cable 102, however, a wavelength in the visible region (e.g., 532 nm) may allow for a visual indication of power and state of the modules 104a–b. For example, a low-rate of on/off signaling (e.g., half second on, half second off) may be directly noticeable to a human observer and thus may be used to indicate that the link could not initialize. A different flashing rate or a predetermined flashing code may indicate that one or more failures have been detected. A high modulation rate (e.g., >100 bits per second) would generally appear to the human eye as a constant light or a constant state and therefor could indicate that the link has initialized and there may be activity from the infrared lasers 112 on the other fiber optic strands 106*a*–*d* and 106*i*–*l*.

Within the modules 104*a*–*b*, the LEDs 116, and the photodetectors 118 may not be in any particular proximity to the high-speed lasers 112 and/or the detectors 114. The LEDs 116 and the photodetectors 118 may be contained in a remote section of the housing 108. Small sections of large core fibers 132*a*–*b* may be embedded between the connector ferrules 122*a*–*b* and the LEDs 116 and the photodetectors 118 to provide for communications externally to the modules 104*a*–*b*.

Figure 5:
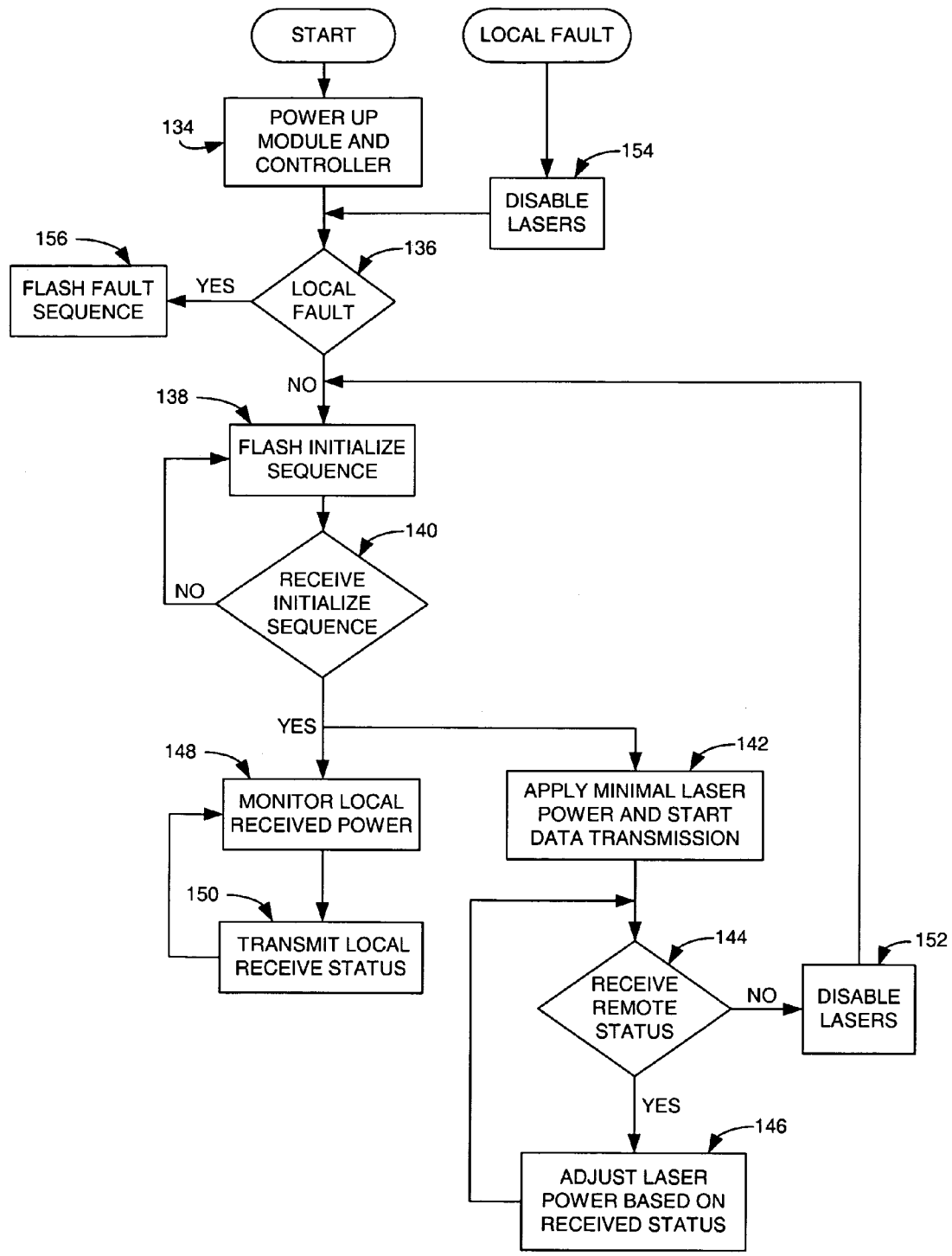
FIG. 5 is a flow diagram of a method of operation.

Referring to FIG. 5, a flow diagram of a method of operation is shown. Operation generally begins with applying power to the modules 104 (e.g., block 134). The power up sequence may include checking the fiber cable 102 by establishing communications between the controllers 124 using the low-speed link LEDs 116 and the photodetectors 118. While establishing the communications on the low-speed links, the controllers 124 may modulate the LEDs 116 to cause the visible signals OPT_STATUS to flash or blink in a predetermined and observable pattern and/or frequency.

The controllers 124 may make use of the signals OPT_STATUS for establishing communications (e.g., decision block 140). If the process of establishing communications does not successfully complete (e.g., the NO branch of the decision block 140), the controllers 124 may continue to modulate the LEDs 116 to flash an initialization code (e.g., block 138). Where communications between the modules 104 cannot be established, the power up sequence may end without energizing the lasers 112.

While no local faults (e.g., thermal, voltage, current, laser, or the like) exists within a module 104 (e.g., the NO branch of decision block 136), each controller 124 may monitor for the signal OPT_STATUS from the other module 104 (e.g., decision block 140). If no communication has been established (e.g., the NO branch of decision block 140), the controllers 124 generally continue to attempt to establish communications. When communication has been established (e.g., the YES branch of decision block 140), the controllers 124 may exchange initialization information with each other (e.g., block 142). While the modules 104 are initializing, the controllers 124 may modulate the LEDs 116 to flash in an initialization pattern.

When a module 104 has received a valid initialize sequence (e.g., the YES branch of decision block 140), the module 104 may complete initialization by enabling the lasers 112 for minimal power (e.g., block 142) and change the LED 116 modulation pattern to appear as another pattern. For example, the modulation pattern may indicate a continuous monitoring of the local photodetector 114 power status (e.g., block 148) and transmission of that status as OPT_STATUS (e.g., block 150). Before or after applying power to the lasers 112, a module 104 may receive user data from the fiber cable 102. The photodetectors 114, transimpedance amplifiers 128, and controller 124 in the receiving module 104 may determine the power levels of the signals OPT_DATA received on each fiber optic strand 106 to generate status data (e.g., block 148). The controller 124 of the receiving module 104 may then transmit the status data back to the sending module 104 via the signal OPT_STATUS (e.g., block 150) and capture a new received power level for transmission as the next signal OPT_STATUS.

Once communication between the modules 104 has been verified by detection of the initialization sequence, the lasers 112 may be enabled (e.g., block 142) and the modules 104 may begin to exchange status information (e.g., blocks 144 and 150). Once status has been received, the modules 104 are generally in communication and may remain eye-safe, regardless of the presented laser power. Because all fibers 106 in the cable 102 must be fully inserted in the receptacles 110 of both modules 104 to allow the initialize sequence to be received, all light generated by the lasers 112 in one module 104 is generally delivered only to the photodetectors 114 in the alternate module 104. Each module 104 may thereafter continuously monitor for reception of the signal OPT_STATUS (e.g., decision block 144). If the signal OPT_STATUS has not been received recently (e.g., the NO branch of decision block 144), the controller 124 may immediately disable the associated lasers 112 (e.g., block 152), stop sending local received power status, and attempt to re-initialize the link. The lack of OPT_STATUS is generally an indication of either a module fault at the remote module 104 or a break in the fiber which could result in a non-eye-safe laser light condition if the lasers 112 remained enabled.

While continuing to receive the signal OPT_STATUS within a predetermined period (e.g., the YES branch of decision block 144), the controller 124 may use the status information provided by the receiving module 104 to adjust the laser power of the local lasers 112 (e.g., block 146). If at any time a local fault is detected within the module 104 (e.g., over or under temperature, over or under voltage, excess laser current, local disable, or the like), the local lasers 112 may all be immediately disabled, regardless of a previous state within the start-up protocol (e.g., block 154). Upon detection of a local fault (e.g., the YES branch of decision block 136), the controller 124 may modulate the local LED 116 to cause the visible signal OPT_STATUS to flash or blink in a predetermined and observable pattern and/or frequency (e.g., block 156), with the pattern or frequency being significantly different from the initialize pattern or frequency.

In one embodiment, the controllers 124 may treat the four local lasers 112 as one or more groups. Therefore, adjustments to the laser output power may be made to multiple lasers substantially simultaneously. Likewise, collection of the power actually received by the photodetectors 114 may be processed by the receiving controller 124 to determine a single status data for each laser group. In another embodiment, the short feedback loop within the modules 104 may be eliminated. The short feedback loop may be undesirable where, for example, a laser driver 126 may compensate for changes in a laser 112 and/or major changes in current. In still another embodiment, the modulation of the LEDs 116 may include a dark or zero percent duty cycle modulation. For example, the modules 104 may include a "watchdog" circuit (not shown) that may switch off the lasers 112 and the LEDs 116 in case of a failure in the controller 124. Therefore, an absence of visible light from a module 104 may indicate that the module 104 may be off or that a catastrophic failure may have occurred.

The various signals of the present invention may be implemented as single-bit or multi-bit signals in a serial and/or parallel configuration. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A module comprising:
   a first transmitter configured to transmit user data through a first physical channel of a connector;
   a first detector configured to receive a first status signal but not receive said user data through a second physical channel of said connector;
   a second transmitter configured to transmit an initialization pattern but not transmit said user data through a third physical channel of said connector; and
   a controller configured to (i) send said initialization pattern to said second transmitter and (ii) adjust a power of said first transmitter in response to said first status signal such that (a) said first transmitter is an off mode until said first status signal indicates that said initialization pattern has been seen at an opposite end of said third physical channel, (b) said first transmitter is in a low power mode until said first status signal indicates that said first transmitter can be seen at an opposite end of said first physical channel and (c) said first transmitter is in a normal power mode thereafter.

2. The module according to claim 1, wherein said second physical channel comprises a multi-mode optical fiber.

3. The module according to claim 2, wherein said first transmitter comprises a non-eye-safe laser.

4. The module according to claim 3, wherein said first detector is configured to detect visible signals and said second transmitter is configured to generate visible signals.

5. The module according to claim 1, further comprising a second detector coupled to said controller and configured to receive said user data through a fourth physical channel of said connector.

6. The module according to claim 5, wherein said controller is further configured to provide a second status signal to said second transmitter in response to said user data as received in both said first physical channel and said fourth physical channel.

7. The module according to claim 6, wherein said second transmitter produces a non-coherent light.

8. The module according to claim 1, wherein (i) a laser driver circuit of said first transmitter is configured to provide a power utilization signal to said controller and (ii) said controller is further configured to adjust said power of said first transmitter in response to said power utilization signal.

9. The module according to claim 1, wherein (i) said connector is configured per a standard defining an unused physical channel and (ii) second physical channel is said unused physical channel.

10. The module according to claim 9, wherein said standard defines at least two unused physical channels that are used by said module.

11. A method of operating a communications link, comprising the steps of:
   (A) transmitting a first user data through a first physical channel in a connector of said communications link;
   (B) receiving a first status signal but not receiving a second user data through a second physical channel in said connector of said communications link;
   (C) transmitting an initialization pattern but not transmitting said first user data through a third physical channel in said connector of said communications link; and
   (D) adjusting a transmission power for said first physical channel in response to said first status signal such that (a) said first physical channel is dark until said first status signal indicates that said initialization pattern has been seen at an opposite end of said third physical channel, (b) said first physical channel carries low power light until said first status signal indicates that said low power light can be seen at an opposite end of said first physical channel and (c) said first physical channel carries normal power light thereafter.

12. The method according to claim 11, further comprising the step of receiving said second user data through a fourth physical channel of said communications link.

13. The method according to claim 12, further comprising the step of transmitting a second status signal through said third physical channel of said communications link in response to said second user data.

14. The method according to claim 13, further comprising the step of receiving a third user data through a fifth physical channel of said communications link.

15. The method according to claim 14, further comprising the step of transmitting said second status signal in response to both said second user data and said third user data.

16. The method according to claim 11, wherein said initialization pattern is an optical pattern noticeable to a human observer.

17. The method according to claim 16, further comprising the step of modulating said first status signal to flash in a fault pattern (i) different than said initialization pattern and (ii) noticeable to said human observer in response to a failed condition in a transmitter module of said communication link.

18. The method according to claim 16, further comprising the steps of:
   disabling transmission through said first physical channel in response to an absence of said first status signal; and
   transmitting said initialization pattern after said disabling.

19. The method according to claim 11, wherein said first status signal is transmitted at least three orders of magnitude slower than said first user data.

20. A module comprising:
   means for transmitting user data through a first physical channel in a connector of a communications link;
   means for receiving a first status signal but not receiving said user data through a second physical channel in said connector of said communications link;
   means for transmitting an initialization pattern but not said user data through a third physical channel in said connector of said communications link; and
   means for adjusting a transmission power for said first physical channel in response to said first status signal such that (a) said first physical channel is dark until said first status signal indicates that said initialization pattern has been seen at an opposite end of said third physical channel, (b) said first physical channel carries low power light until said first status signal indicates that said low power light can be seen at an opposite end of said first physical channel and (c) said first physical channel carries normal power light thereafter.

* * * * *